(12) United States Patent
Möller

(10) Patent No.: US 6,394,031 B1
(45) Date of Patent: May 28, 2002

(54) NEST ARRANGEMENT FOR POULTRY

(75) Inventor: Günter Möller, Essen (DE)

(73) Assignee: Big Ditchman International GmbH, Vechta (DE)

( * ) Notice: Subject to any disclaimer, the term of this patent is extended or adjusted under 35 U.S.C. 154(b) by 13 days.

(21) Appl. No.: 09/660,313

(22) Filed: Sep. 12, 2000

(30) Foreign Application Priority Data

Sep. 23, 1999 (DE) ..................... 299 16 752 U

(51) Int. Cl.[7] .................................. A01K 31/16
(52) U.S. Cl. ...................... 119/337; 119/335
(58) Field of Search .................. 119/334, 335, 119/336, 337, 338, 440

(56) References Cited

U.S. PATENT DOCUMENTS 5,058,530 A  * 10/1991 Van De Ven ............... 119/337

FOREIGN PATENT DOCUMENTS

| DE | 42 03 637 | 8/1993 | ............... 119/335 |
| DE | 297 20 618 | 3/1998 | |

* cited by examiner

Primary Examiner—Robert P. Swiatek
(74) Attorney, Agent, or Firm—Collard & Roe, P.C.

(57) ABSTRACT

A laying nest arrangement for poultry comprises at least one housing with housing walls having at least one passage opening for the poultry, and at least one housing floor. A transporting device for laid eggs is guided along an edge of the housing floor. The housing floor has a downward inclination in the direction of the transporting device. The housing floor is formed by at least two floor plates that can be swiveled in relation to each other about a swiveling axis aligned in parallel with the longitudinal expanse of the transporting device, and which extends in the plane of the housing floor. There is a swiveling element by which each floor plate can be swiveled separately.

15 Claims, 4 Drawing Sheets

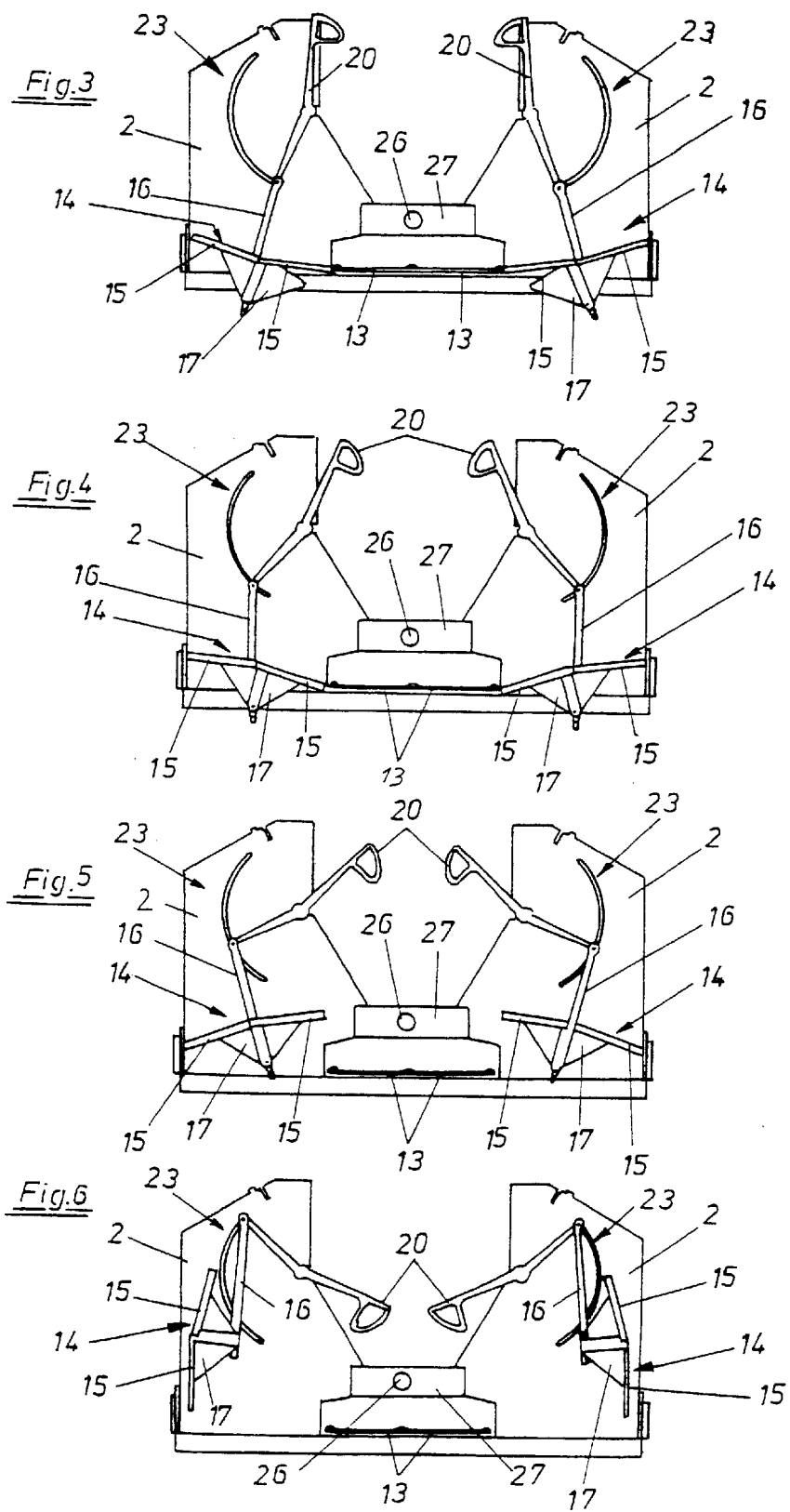

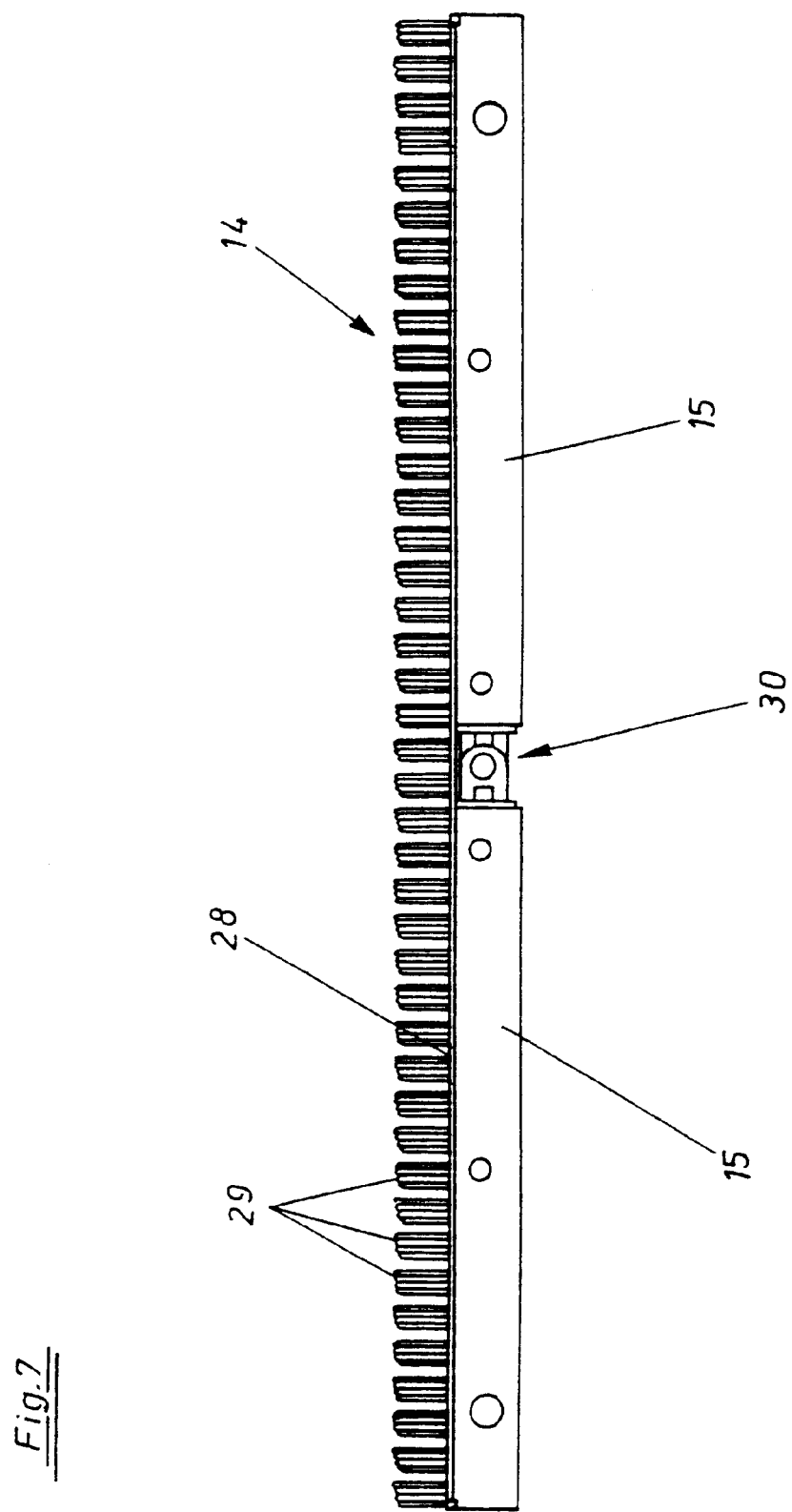

NEST ARRANGEMENT FOR POULTRY

BACKGROUND OF THE INVENTION

1. Field of the Invention

The invention relates to a nest arrangement for poultry comprising at least one housing with walls having at least one passage opening for the poultry. The housing has at least one floor. There is a transporting device for transporting off the laid eggs, which is guided along an edge of the housing floor. The floor is sloped downwards toward the transporting device.

2. The Prior Art

Laying nest arrangements are usually installed in large industrial-type henhouses, so that the eggs laid by the hens can be collected and transported off in an industrial manner. Within the housing of the laying nest arrangement, there is a location for the poultry for laying the eggs. The housing forms a closed room in which the laying hens can enter through at least one passage opening in one of the walls of the housing. Eggs laid on the floor of the housing roll down the floor because of their shape and the incline of the floor. The eggs then roll into the transporting device for removing the eggs, because the floor of the housing is sloped downwards toward the transporting device. The transporting device is, for example a conveyor belt, which receives the eggs rolling down the floor of the housing, and transports such eggs away from the laying nest arrangement.

The floor of the housing is frequently soiled by excrement, residues of fodder and feathers and the like, so that if the downward slope of the housing floor is not steep enough, eggs are retained on the floor of the housing due to the uneven surface as a result of the dirt on the floor. So that eggs can overcome uneven spots via gravity and roll down and onto the transporting device, a steeper downward inclination of the floor is adjusted with known laying nest arrangements. This has the drawback that the eggs roll down at a higher speed because of the steeper downward slope of the housing floor. This occurs especially when the rolling path is relatively long because of a wide or deep housing floor.

Thus, eggs rolling down the floor roll onto the transporting device at high speed and collide there with obstructions such as a lateral limitation of a conveyor belt, or eggs already lying on the conveyor belt. The shocks resulting from such collisions exert forces on the egg shells, which regularly leads to hair fissures in the shells and frequently even to crushing of the shells. Damaged eggs cannot be utilized and cannot be sold to the food trade because of their reduced durability. This results in a high rejection rate in the production of eggs.

SUMMARY OF THE INVENTION

It is therefore an object of the invention to provide a laying nest arrangement of the type specified above that assures a reduction of the rejection rate.

This and other objects are accomplished according to the invention by a laying nest arrangement in which the floor of the housing consists of at least two floor plates that can be swiveled against each other about a swiveling axis that is aligned in parallel with the longitudinal expanse of the transporting device and extending in the plane of the floor of the housing. There is at least one swiveling element that effects a separate swinging movement of each floor plate.

In the laying nest arrangement as defined by the invention, the floor of the housing is not designed in the form of one piece, but it is divided into sections formed by floor plates. For example, the housing floor can be divided in two floor plates that are disposed in one plane to form the entire floor of the housing. Both floor plates can be swiveled against each other, i.e., one floor plate can be swiveled versus the other floor plate. The swiveling axis is disposed in the plane of the floor of the housing. This assures that a coherent housing floor continues to be formed even when the floor plates are swung against each other. The housing floor may consist of two sections with different downward inclinations or sloped positions in relation to the transporting device.

When one floor plate is swiveled versus the other, it has a different angle of inclination with respect to the environment of the housing floor, in particular with respect to the transporting device. In particular, the inclination can be steeper, so that any eggs that are already stuck on the floor plate roll off again. The other floor plate, on the other hand, may have a lesser inclination. The eggs can roll from the floor plate with the greater downward inclination onto the floor plate with the lesser downward inclination, and are not accelerated further, as it is the case with a housing floor with a greater inclination all the way through. This quasi-braking of the eggs is caused by the friction of the eggs on the floor plate, the rolling resistance, which is counteracted by a lower force of forward motion because of the lower friction. This prevents the eggs rolling down from attaining a speed that, in the event of collision with obstructions or other eggs, could lead to mechanical damage to their shells.

Once the eggs have rolled from the floor plate with the greater inclination onto the other floor plate with the lesser inclination, the latter floor plate can also be set to a steeper slope independently of the other floor plate, using a swiveling element. This means that the angle of inclination of the latter floor plate is increased. However, this increase does not take place simultaneously with the increase of the angle of inclination of the first floor plate, but subsequently.

Therefore, the laying nest arrangement as defined by the invention has a housing floor that does not have a uniform downward slope. The inclination of the floor plates is increased separately in the direction of the transporting device. The inclinations are preferably increased in a time sequence, so that eggs rolling down are rolling like on a wave, i.e., the eggs roll from a floor plate with a steeper inclination onto the next-following floor plate with a lower inclination, whereupon the inclination of the latter floor plate is increased, so that an egg cannot remain lying on the latter floor plate and will continue to roll down. Due to the lower inclinations of the floor plates onto which the eggs roll first, the eggs are slowed down, so that damage to the eggs is clearly reduced and the rejection rate is consequently reduced as well.

Because of the alignment of the swiveling axis between the floor plates parallel with the longitudinal expanse of the transporting device, the individual floor plates can be set to an angle of inclination in a sequence that assures that the eggs are carefully guided to the transporting device. For this purpose, the floor plate that is farthest removed from the transporting device is set to a steeper angle first. As an alternative, this floor plate may be permanently set to a steeper inclination. The eggs can then roll from this floor plate onto a floor plate that is closer to the transporting device. By continuously setting the floor plate, and, if need be, additional floor plates to increasingly steeper angles upwards, the eggs can finally roll down to the transporting device because they are always slowed down whenever they seem to reach an excessively high roll-off speed.

Because of the controlled roll-off movements of the eggs, it is possible to produce a housing floor with a larger width, i.e. with a greater depth in the direction of the transporting device. With known laying nest arrangements, a greater width would cause the eggs to reach an excessively high speed over the long roll-off distance. With the laying nest arrangement as defined by the invention, the eggs are prevented from reaching a high speed because they are slowed down by the different angles of inclination of the floor plates. With a greater width, however, it is possible to accommodate a greater number of laying hens in the laying nest arrangement, which offers the substantial advantage that the egg production can be increased.

The separate floor plates of the housing floor can be freely arranged next to each other in one plane. However, it is also possible to connect the floor plates with each other by a joint, for example a hinge, so that the floor plates continue to be capable of swinging against one another. Their swinging movements are guided by the hinge or hinges or other articulated means of a similar type.

For swinging each floor plate separately, one single swinging element is present for each floor plate. For example, a lever or an operating cylinder can serve as the swinging element, which separately engages a floor plate and causes it to swivel. Starting from the floor plate that is located farthest from the transporting device for the eggs, for example, the swiveling elements can be actuated one after the other, so that the inclinations of the floor plates are successively increased. As an alternative, one common swiveling element is available for two floor plates arranged adjacent to each other. Separate swiveling of the two floor plates can be achieved with one swiveling element if the it first engages one floor plate changing its inclination, and subsequently engages the second floor plate in the same way.

According to a further development of the invention, the floor of the housing is pivot-mounted on a tilting axle. The axle is associated with an edge of the housing floor that is closely located to a passage opening. There is also a tilting drive. The floor of the housing can be swiveled not only by and in itself by the various floor plates, but tilted about a tilting axle as a whole. The tilting axle is associated with the edge of the housing floor that is located close to the passage opening, or to several passage openings in a wall of the housing.

When the floor of the housing is tilted about the tilting axle, it is guided from the inside against the passage openings. This closes the passage openings, so that with the floor of the housing in this position, access to the laying nest arrangement is blocked for the hens. During rest time periods, the hens cannot enter the laying nest arrangement and cannot soil it with excrements. Thus, fouling of the floor of the housing and any unevenness of its surface resulting from such soiling are prevented. At the same time, by tilting the floor of the housing, dirt is removed from its surface in that it drips down from the housing floor when the it is set to a vertically tilted position. The housing floor is tilted with a tilting drive designed in a suitable way. The tilting drive can be realized separately from the swiveling elements for swinging the floor plates.

With the present invention, eggs that remained lying on the floor are prevented from being thrown from the laying nest arrangement when the floor of the housing is tilted. The design of the floor makes it advantageously possible to carefully move eggs that remain lying on the floor plates of the housing floor to the transporting device before the housing floor is tilted.

According to a particularly useful embodiment of the invention, the tilting drive comprises a tie rod that is guided past the floor of the housing on the side. The free end of the tie rod is arranged below the floor of the housing and has the swiveling element arranged on it, for example for two floor plates disposed adjacent to each other. In this embodiment, the swiveling elements are integrated in the tilting drive. By actuating the tilting drive, it is possible to simultaneously actuate the swiveling elements and to tilt the floor of the housing. The design structure is simplified because the two moving drives are combined, and because structural components are saved in this way.

The housing of the laying nest arrangement as defined by the invention is arranged on a frame-like rack, so that a space is available below the floor of the housing for arranging a swiveling element there. The swiveling element is arranged on the free end of the tie rod below the floor of the housing, which assures that the surface of the housing floor, which is accessible to the poultry, is free of structural components of the swiveling element. Such components are arranged underneath the floor of the housing and engage the floor from below, specifically its individual floor plates. The tie rod exerts an upward tensile force on the swiveling element. Overall tilting of the housing floor is effected via the tensile force, and the individual floor plates of the housing floor are successively moved into positions of inclination with increasingly steeper angles of slope from one floor plate to the next.

According to a further development of the invention, the swiveling element is an approximately triangular support plate that is pivot-mounted on the free end of the tie rod below the housing floor. One side of the triangular support plate is designed in the form of a support edge for two floor plates. When the tie rod is moved upwards, the support plate, because of the articulated mount on the tie rod, is moved upwards as well, engaging the floor of the housing from below. Due to its pivotal articulation on the tie rod, the support plate can first be in a position of swivel in which its support edge engages one of the two floor plates. This floor plate is farther removed from the transporting device than the other floor plate. Before the tie rod is moved, it is preferably set at a steeper angle upwards, so that eggs can roll from the floor plate onto the other floor plate. When the tie rod is then lifted, the support edge of the triangular support plate engages also the other floor plate and thereby increases the its inclination with respect to the plane of the transporting device. The eggs lying on the floor plate can then roll from the plate and onto the transporting device.

To ensure that the floor plates are swiveled one after the other to change their inclinations, the support edge of the approximately triangular support plate has bevels on both sides, starting from the center of its longitudinal expanse. The bevels interact with the bottom sides of the floor plates, abutting the latter. Because of the swingability of the triangular support plate and the bevels, the one beveled side of the support edge will abut the one floor plate first before the other beveled side of the support edge abuts the adjacent floor plate. The bevels each extend through continuously, so that the beveled section of the support edge is straight.

So that the tie rod is capable of performing a pulling movement upwards, the tilting drive comprises a rocker having the tie rod pivot-mounted on one of its free ends, and having its other free end engaged by a force-transmitting means. Via the force-transmitting means, the rocker can be put into a swinging motion, in the course of which the free end of the rocker is moved upwards. The tie rod is moved upwards in this way, whereupon the swiveling elements, or one swiveling element arranged on its free end below the floor of the housing can engage the bottom side of the housing floor.

The force-transmitting means can be a belt wound on a shaft. The shaft can be put into reversible rotational motion by a suitable drive, whereupon the belt is wound on the shaft or unwound from the shaft, which causes the rocker to swing. Other force-transmitting means such as chains can be employed as well.

According to a further development of the invention, one wall of the housing has at least one passage opening for the poultry, and the transporting device for carting off the laid eggs is arranged on the side of the housing floor opposing the wall of the housing. Through this arrangement, the floor of the housing is inclined downwards toward the transporting device, starting from the passage opening for the poultry. In this way, the transporting device is arranged within the housing, so that the hens are aligned in the direction of the passage opening, facing the opening with their heads, so that the eggs are laid within the zone of the transporting device. The consequence is a shorter distance of roll-off of the egg.

Accordingly, the hens are prevented from facing the interior of the housing with their heads. This substantially reduces the risk of injury of an egg-laying hen by so-called cloak pickers. The cloak points into the laying nest arrangement and cannot be reached from the outside by animals foraging in front of the passage opening. Because the downward inclination of the housing floor is aligned inwards in the direction of the transporting device, the hen laying an egg is sitting on the housing floor with its chest in an elevated position. This arrangement also reduces injuries to the hens.

The transporting device is preferably a known conveyor belt, which can be installed along a plurality of housing floors of a plurality of housings by providing it with the required length.

Several housings can be combined in one group of housings, in which the rockers of the tilting drives associated with each of such housings can be actively connected with a common shaft. For example, housings facing each other can be separated from each other by back walls. A back wall can be arranged above the transporting device for the eggs. This arrangement offers the advantage that the back wall prevents the hens from stepping onto the transporting device and from soiling the latter. The housings can also be arranged in several layers.

A mat may be placed on the floor of the housing. This mat covers the separate floor plates and the spacing formed between the floor plates, in particular the gap. This produces a housing floor with a closed surface. The mat may be provided with elastic naps, which, due to their elasticity, act as a suspension means when an egg is laid, so that the egg is prevented from impacting the floor plate hard.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIGS. 3 to 6 are side views of two housing walls opposing each other and each separating two housings from one another; and FIG. 7 is a side view of a structural part of the laying nest arrangement.

DETAILED DESCRIPTION OF THE PREFERRED EMBODIMENT

Figure 1:
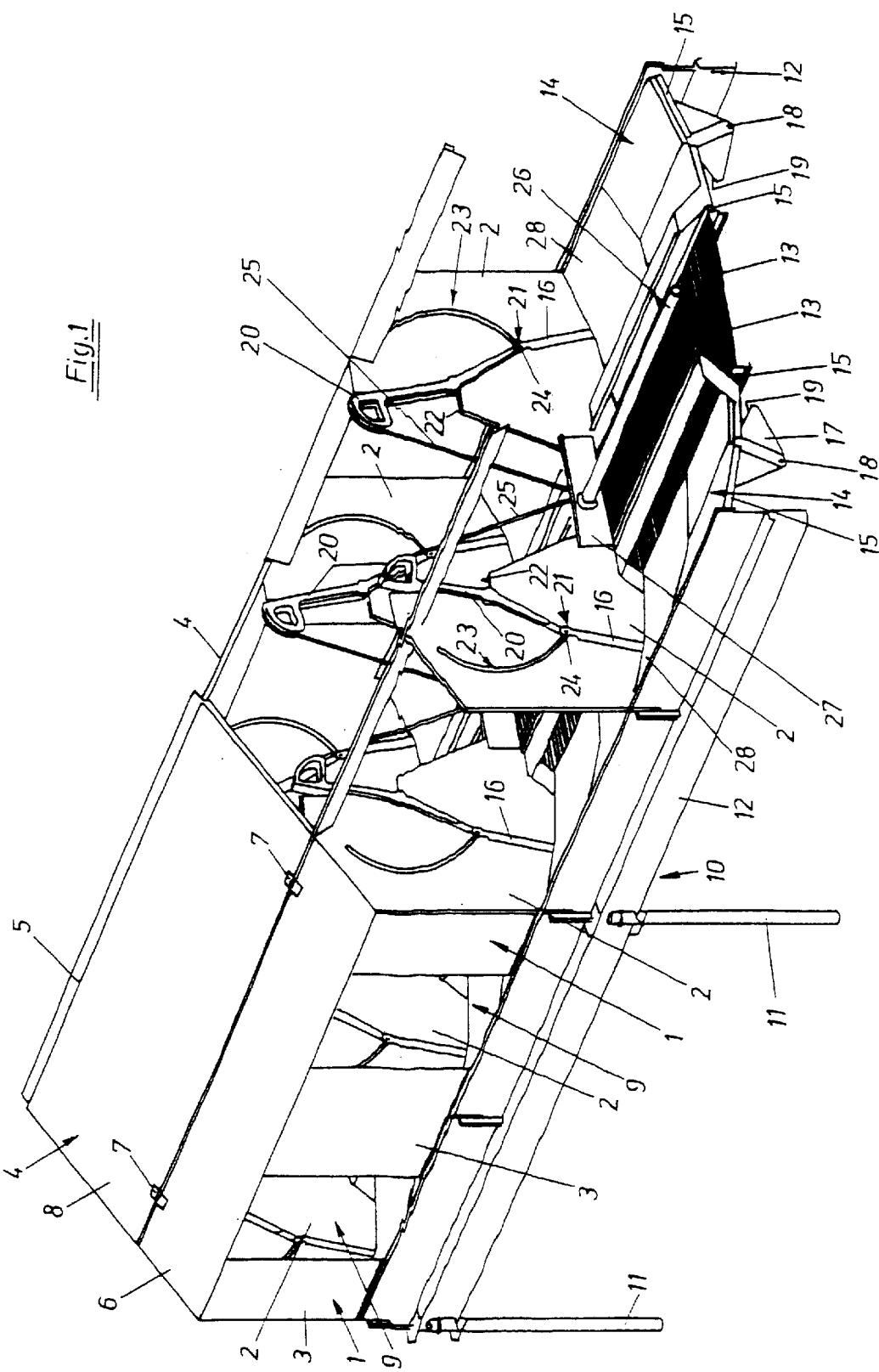
FIG. 1 is a perspective view of a partly open laying nest arrangement for poultry, with a number of housings each separated from the other by housing walls.

Referring now in detail to the drawings, the laying nest arrangement shown in FIG. 1 has a plurality of the housings 1 arranged next to one another in two rows. Four housings 1 are arranged in each row. Each housing 1 is defined by the housing side walls 2, 3, and a housing roof 4. The housing back walls arranged between the housings 1 opposing each other are not shown. The housings 1 shown in FIG. 1 on the right side are drawn in the drawing without the housing walls 3 and the housing roof 4. The housing roof 4, which is arranged on each side of the housing roof ridge 5, is divided in two parts. A housing roof section 6 is hinged on the housing roof section 8 via the hinges 7.

The housing wall 3 has the passage openings 9 for the poultry. All housings 1 are arranged on a frame rack 10. The frame rack 10 has the standing legs 11, which can be set up on a ground not shown, and frame sections 12, which are connected with legs 11. Housings 1 rest on frame sections 12.

Two housings 1 oppose each other in pairs. The two conveyor belts 13 as the transporting device for the eggs are arranged between housings 1. A shaft 26 is arranged above the conveyor belts 13 and extends parallel with the conveyor system of conveyor belts 13.

The housing floors 14 of the housings 1 are associated with the conveyor belts 13 on both sides.

Figure 2:
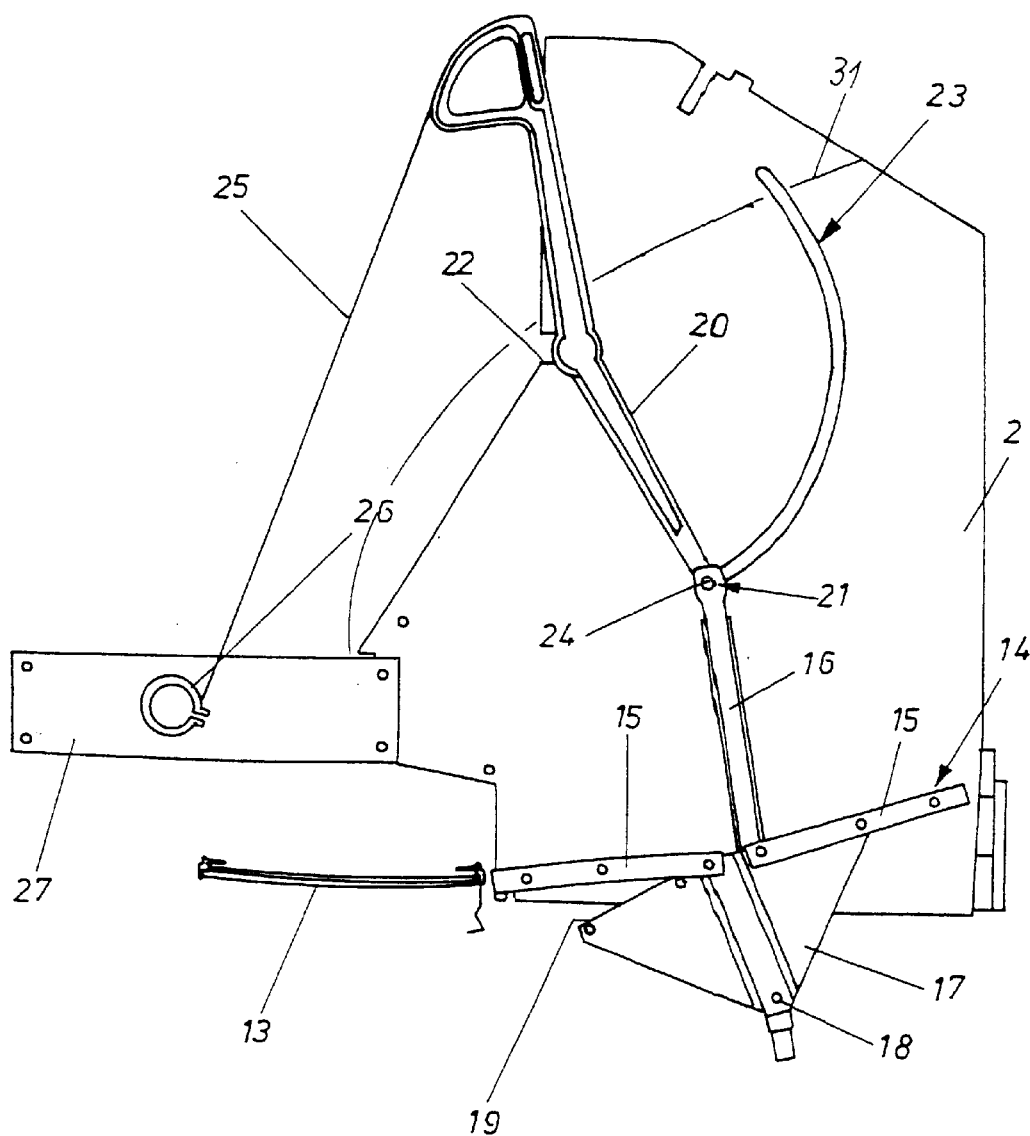
FIG. 2 is a side view of a housing wall separating two housings from one another.

FIG. 2 shows the structure of a housing floor 14 as well as its arrangement within a housing 1. The housing floor 14 consists of two floor plates 15. Floor plates 15 are disposed next to each other, so that they form a closed housing floor 14. Both floor plates 15 are swiveled against each other about a swiveling axle. The swiveling axle is arranged between the side edges of the floor plates 15 facing each other, so that one floor plate 15 can be swiveled relative to the other floor plate 15 without canceling the formation of a closed housing floor 14.

A tie rod 16 is associated with the housing floor 14. The tie rod 16 is arranged next to the housing floor 14. FIG. 1 shows that a tie rod 16 is associated with each housing floor 14 in the zone of the two face edges of its floor plates 15. The free end of the tie rod 16 is arranged beneath the housing floor 14. A triangular support plate 17 swinging about a swiveling axle 18 is pivot-mounted on the free end. The support plate 17 has a support edge 19, against which the bottom sides of the two floor plates 15 can be placed. The support plate 17 is articulated on the tie rod 16 so that one corner of the triangle points in the direction of the free end of the tie rod 16. The support edge 19 is arranged opposite the corner.

FIG. 2 shows that support edge 19 is placed against the floor plate 15 that is farther removed from conveyor belt 13. Support edge 19 is not placed against the second floor plate 15. This results in two different inclinations of floor plates 15 in relation to the plane of the conveyor belt 13. The floor plate 15 that is farther removed from the conveyor belt 13 is set at a steeper inclination in relation to the plane than the other floor plate 15. The different inclinations of the floor plates 15 result from the angled position of the support plate 17 with respect to the longitudinal expanse of the tie rod 16.

This assures that the zone of the support edge 19 associated with the floor plate 15 that is farther removed from the conveyor belt 13 is placed against the floor plate 15, whereas the zone of the support edge 19 associated with the other floor plate 15 is not yet placed against the floor plate 15.

The bevels provided in the support edge 19 contribute to this situation as well. Starting from the center of the longitudinal expanse of the support edge 19, the two sections of the support edge 19 extend outwards and slanted downwards. Because of this sloped expanse, support edge 19 is outwardly increasingly removed from the bottom side of the floor plate 15 that is associated closer to the conveyor belt 13.

The other end of the tie rod 16, which is facing away from the support plate 17, is pivot-mounted on the free end of a rocker 20, swinging about an axle 21. In the center of its longitudinal expanse, rocker 20 in turn is pivotally placed on a support shoulder 22. Support shoulder 22 is formed by housing wall 2, which is provided with a corresponding cut. Furthermore, a cutout 23 having the shape of a circular arc is provided in housing wall 2; the imagined center point of this cutout coincides with the swiveling axis of the rocker 20. A bolt 24 supplying the swiveling axle 21 is passed through the cutout 23. The bolt 24 connects the sections of the rocker 20 extending on both sides of the housing wall 2 with each other.

A belt 25 serving as the force-transmitting means engages the other free end of rocker 20. The belt is wound on the shaft 26. Shaft 26 is supported by a support section 27, which in turn is connected with two housing walls 2 opposing one another via suitable fastening means, holding the walls. A back wall 31 curving upwards is arranged above the housing floor 14. Back wall 31 prevents the hens from stepping onto the conveyor belt.

FIGS. 3 to 6 show that when rocker 20 is swiveled, swinging floor 14 is tilted about a tilting axle. The tilting axle is associated with the edge of the floor plate 15 that is disposed close to passage opening 9 in housing wall 3, the floor plate being farther removed from conveyor belt 13. Belt 25 and back walls 31 are not shown in the figures for the sake of superior illustration.

FIG. 3 shows rockers 20 in their starting positions. When the rockers are in these positions, floor plates 15 are inclined to different degrees. The floor plate 15, which is farther removed from the associated conveyor belt 13, is set at a steeper angle than the other floor plate 15.

In FIG. 4, swiveling of rocker 20 causes each tie rod 16 to be lifted, whereby the support plate 17 articulated on the free end of tie rod 16 is also lifted. The support edge 19 of support plate 17 is placed against the floor plate 15 that is arranged closer to conveyor belt 13 as well. The effect of such abutment is that the inclination of floor plates 15 in relation to the plane of conveyor belts 13 is increased. Because of the bevels in support edge 19, the floor plate 15 that is farther removed from the conveyor belts 13 still has an inclination in the direction of conveyor belt 13.

FIGS. 5 and 6 show further conditions of tilt of housing floors 14. When the floors are tilted, the eggs on floor plates 15 cannot roll onto the conveyor belts 13 because floor plates 15 are no longer slanted in the direction of the conveyor belts 13. Housing floors 14 close the passage openings 9 in housing walls 3.

FIG. 7 shows that a mat 28 is placed on the housing floor 14 formed by floor plates 15. Mat 28 has upward projection naps 29. FIG. 7 shows that floor plates 15 are connected with each other by a hinge 30.

Accordingly, while only a few embodiments of the present invention have been shown and described, it is obvious that many changes and modifications may be made thereunto without departing from the spirit and scope of the invention.

What is claimed is:

1. A laying nest arrangement for poultry, comprising:

at least one housing with housing walls having at least one passage opening for the poultry and a housing floor, said housing floor being formed by at least two floor plates;

a transporting device for laid eggs guided along an edge of the housing floor, wherein the housing floor is sloped downward toward the transporting device; and at least one swiveling element effecting separate swiveling of each floor plate, wherein said floor plates are pivotable in relation to each other about a swiveling axis aligned parallel with a longitudinal expanse of the transporting device and extending in a plane of the housing floor.

2. The laying nest arrangement according to claim 1, wherein the floor plates are connected with each other by at least one hinge.

3. The laying nest arrangement according to claim 2, wherein there is a swiveling element for each floor plate.

4. The laying nest arrangement according to claim 2, wherein a common swiveling element is provided for two floor plates disposed adjacent to each other.

5. The laying nest arrangement according to claim 1, wherein the housing floor is pivotally supported and tilts about a tilting axle associated with an edge of the housing floor disposed close to said at least one passage opening, and further comprising a tilting drive for tilting the housing floor.

6. The laying nest arrangement according to claim 5, wherein the tilting drive comprises a tie rod guided laterally past the housing floor, said tie rod having a free end that is arranged below the housing floor, and wherein the at least one swiveling element is arranged on the free end of the tie rod.

7. The laying nest arrangement according to claim 6, wherein the at least one swiveling element is an approximately triangular support plate that is pivot-mounted on the free end of the tie rod below the housing floor, and wherein one side of the triangular support plate is designed as a support edge for two floor plates.

8. The laying nest arrangement according to claim 7, wherein the support edge has bevels on both sides, starting from the center of its longitudinal expanse.

9. The laying nest arrangement according to claim 8, wherein the bevels each extend continuously.

10. The laying nest arrangement according to claim 6, wherein the tilting drive comprises a rocker having the tie rod pivot-mounted on its free end and having its other end engaged by a force-transmitting means.

11. The laying nest arrangement according to claim 10, wherein the force-transmitting means is a belt wound on a shaft.

12. The laying nest arrangement according to claim 10, wherein several housings are combined in a housing group whose associated rockers are each driven by a common shaft.

13. The laying nest arrangement according to claim 1, wherein the transporting device for the laid eggs is arranged on a side of the housing floor disposed opposite said at least one passage for poultry.

14. The laying nest arrangement according to claim 1, wherein the transporting device is a conveyor belt.

15. The laying nest arrangement according to claim 1, further comprising a mat placed on the housing floor.

* * * * *